US009360888B2

(12) United States Patent
Howard

(10) Patent No.: US 9,360,888 B2
(45) Date of Patent: Jun. 7, 2016

(54) SYSTEM AND METHOD FOR MOTION DETECTION AND INTERPRETATION

(71) Applicant: Stephen Howard, Dallas, TX (US)

(72) Inventor: Stephen Howard, Dallas, TX (US)

( * ) Notice: Subject to any disclaimer, the term of this patent is extended or adjusted under 35 U.S.C. 154(b) by 137 days.

(21) Appl. No.: 13/890,709

(22) Filed: May 9, 2013

(65) Prior Publication Data

US 2014/0333745 A1    Nov. 13, 2014

(51) Int. Cl.
| | | |
|---|---|---|
| G06F 1/16 | (2006.01) | |
| G06F 3/01 | (2006.01) | |
| H04N 5/225 | (2006.01) | |
| G06F 3/041 | (2006.01) | |
| G06F 3/042 | (2006.01) | |

(52) U.S. Cl.
CPC ............. *G06F 1/1605* (2013.01); *G06F 3/01* (2013.01); *G06F 3/012* (2013.01); *G06F 3/017* (2013.01); *G06F 3/0416* (2013.01); *G06F 3/0425* (2013.01); *H04N 5/2254* (2013.01)

(58) Field of Classification Search
CPC ........... H04N 7/00; G09G 3/24; G06F 1/1605
See application file for complete search history.

(56) References Cited

U.S. PATENT DOCUMENTS

| | | | | |
|---|---|---|---|---|
| 5,528,263 | A * | 6/1996 | Platzker et al. | 345/156 |
| 6,339,748 | B1 * | 1/2002 | Hiramatsu | 702/159 |
| 6,512,536 | B1 * | 1/2003 | Ross | G01B 11/105 348/61 |
| 6,759,979 | B2 * | 7/2004 | Vashisth et al. | 342/357.31 |
| 7,034,807 | B2 * | 4/2006 | Maggioni | 345/173 |
| 7,046,838 | B1 * | 5/2006 | Sakagawa et al. | 382/154 |
| 7,084,857 | B2 | 8/2006 | Lieberman et al. | |
| RE40,368 | E | 6/2008 | Arnon | |
| 7,598,942 | B2 | 10/2009 | Underkoffler et al. | |
| 8,094,129 | B2 | 1/2012 | Izadi et al. | |
| 8,331,998 | B2 | 12/2012 | Baratono et al. | |
| 2006/0249679 | A1 * | 11/2006 | Johnson et al. | 250/332 |
| 2007/0217042 | A1 * | 9/2007 | Kweon | 359/850 |
| 2008/0029691 | A1 | 2/2008 | Han | |
| 2010/0302138 | A1 * | 12/2010 | Poot et al. | 345/156 |
| 2012/0044141 | A1 * | 2/2012 | Ueshima et al. | 345/158 |
| 2012/0162077 | A1 | 6/2012 | Sze et al. | |
| 2012/0212413 | A1 | 8/2012 | Plagemann et al. | |
| 2012/0262366 | A1 * | 10/2012 | Zhu et al. | 345/156 |
| 2012/0268372 | A1 | 10/2012 | Park et al. | |

(Continued)

FOREIGN PATENT DOCUMENTS

| | | |
|---|---|---|
| EP | 2210532 | 7/2010 |
| EP | 2397932 | 12/2011 |

*Primary Examiner* — Devona Faulk
*Assistant Examiner* — Hai Tao Sun
(74) *Attorney, Agent, or Firm* — Schultz & Associates, P.C.

(57) ABSTRACT

A motion detection and interpretation system comprising a camera plus an infrared transmitter/receiver paired with a single reflective surface that records image data from two vantage points. The camera is connected to a computer and a display screen. The system creates a virtual touch screen for interaction with the display screen. The components of the system can be protected behind a transparent barrier while the virtual touch screen is provided for user interaction thus preventing user interference with, deterring vandalism and theft of, and prolonging the usable life of the equipment. In addition to finite hand movements detected by the virtual touch screen, the system can also simultaneously perform facial recognition and body movement recognition. The system is capable of interpreting multi-touch inputs. All recognitions are defined in the computer to carry out preprogrammed responses.

26 Claims, 12 Drawing Sheets

(56) References Cited

U.S. PATENT DOCUMENTS

2012/0299879 A1 11/2012 Kim
2012/0326958 A1 12/2012 Deuel et al.

\* cited by examiner

SYSTEM AND METHOD FOR MOTION DETECTION AND INTERPRETATION

FIELD OF THE INVENTION

This disclosure relates to the field of automated motion detection. More particularly this disclosure relates to computer vision systems registering body motion inputs and translating such inputs into computer instructions.

BACKGROUND OF THE INVENTION

Interactive motion detection and interpretation is useful in many modern computing applications such as gaming, retail, bank teller machines, and communications. In the prior art, a video camera, an infrared (IR) emitter/detector, a display screen and a computer processor are required to translate body motion inputs into computer instructions. In the prior art, a single camera only works sufficiently in applications that recognize broad movements, such as gaming, but not in applications that require inputs from small or discrete movements or that require an obstructed view of the user. In many applications, such as gaming, the display may block some portion of the camera's view of the user. In other applications, such as bank teller machines, physical security of the system often times requires an obstructed view of the user. To compensate for an obstructed view, the prior art requires additional cameras placed behind, above, or to the side of the display to provide an unobstructed view of the user. However, multiple cameras increase complexity and cost.

For example, U.S. Pat. No. 7,598,942 to Underkoffler, et al. discloses a gestural interface to visually presented elements on a display screen. Multiple cameras capture movement and detect location and orientation and generate output signals to processors connected to a computer. The processors translate the camera outputs into gestural signals which are interpreted as input information. The computer uses the input information to generate commands to control computer functions.

U.S. Pat. No. 7,034,807 to Maggioni discloses a system for interaction with a display. The system includes a recording unit for recording a pointer object in the vicinity of the display. A computer is connected to the recording unit and is used to determine a position of the pointer object. The system requires multiple cameras and multiple reflective surfaces.

U.S. Patent Application Publication No. 2012/0212413 to Plagemann, et al. discloses a system for receiving image information and translating it into computer instructions. Image information is received for a single predetermined action space to identify motion. A camera combined with mirrors, prisms, or optic cables is used to gather the image information. However, only one action area is monitored at any given time.

U.S. Patent Application Publication No. 2012/0162077 to Sze, et al. discloses an input device used to detect locations and motions of objects in a virtual working area. A camera is directed to a region of interest. A region of interest is illuminated by a "flat" beam of light. An object is placed in the region of interest and illuminated. The camera captures an image of the object and sends it to the processor. The processor processes the image to obtain locations and movements. Based on the movements, the processor produces computer instructions.

Therefore, there is a need for a system of motion detection which requires only a single camera to gather video data from an obstructed viewpoint and to create a virtual touch screen for interpreting fine motor movements and translating them into computer instructions. There is also a need to provide physical security for such a system to prevent vandalism and theft.

SUMMARY OF THE INVENTION

The system disclosed gathers video data and depth information from around an obstruction with a single camera. A single mirror is geometrically positioned in such a way as to provide the camera a reflected view around the obstruction. The system creates a virtual touch screen for interaction with the computer from behind a glass barrier which prevents any physical contact between the user and the system.

Unlike the prior art, it is not required that the single camera of the system disclosed have an unobstructed view of the user. A novel positioning of the camera and the mirror provides a view of body movements and image recognition and a view around the obstruction to capture fine motor movements of, for example, a user's hands interacting with a virtual touch screen. The system also provides a novel component positioning which allows the components of the system to be protected behind glass, while still being accessible to the user via the virtual touch screen.

The system can simultaneously react to fine motor inputs and perform facial recognition. For example, it is possible for the system to identify a user by his facial characteristics and query the user for a manually entered personal identification number (PIN) at the same time. Other examples of useful embodiments include adaptive advertising displays in store windows, automatic teller machines requiring secure financial transactions, and building entrance security.

The virtual touch screen is a predefined three dimensional set of coordinates in which movements and positions behind an obstruction are recognized. The action area can be comprised of a plurality of separately defined actions areas each corresponding to a different function. When an object is detected in the action area, it is recognized and interpreted as a set of specific computer instructions. In one embodiment, a signal is sent to a display screen that confirms the interpretations to the user as they are being made.

BRIEF DESCRIPTION OF DRAWINGS

Reference will now be made to the following drawings.

DETAILED DESCRIPTION

Figure 1:
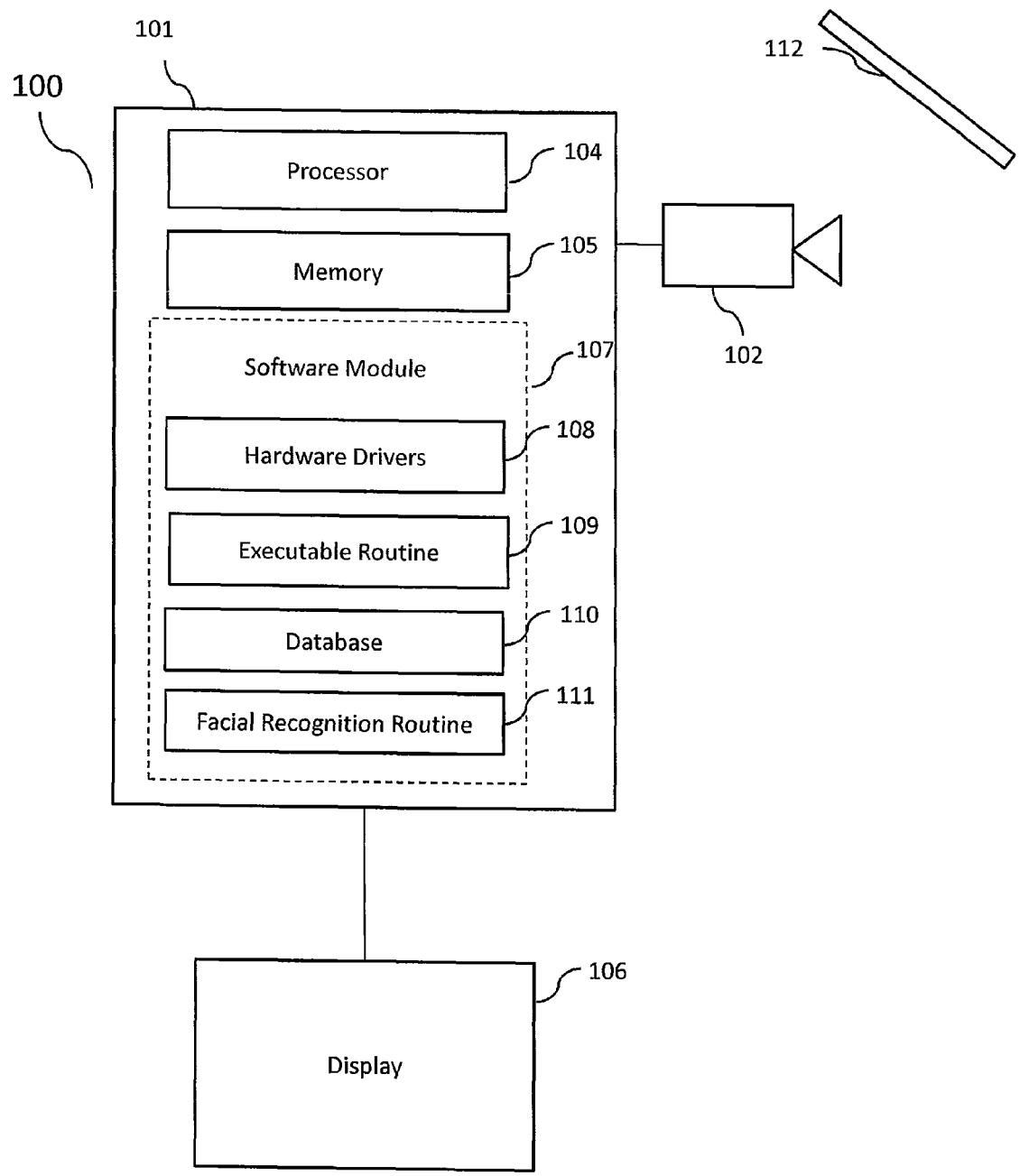
FIG. 1 is a schematic diagram of the components of a preferred embodiment.

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware or combining software and hardware implementation that may all generally be referred to herein as a "circuit," "module," "component," or "system" (including firmware, resident software, micro-code, etc.). Further, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. The propagated data signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wire line, optical fiber cable, RF, or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

Aspects of the present disclosure are described herein with reference to flowchart illustrations and/or block diagrams of methods, systems and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring to FIG. 1, components of motion detection and interpretation system 100 include computer 101 connected to camera 102. Camera 102 is known in the art and includes firmware for movement interpretation and image recognition. An example is the Carmine 1.08 3D sensor from PrimeSense of Tel-Aviv, Israel. Another example is the Xbox Kinect from Microsoft of Redmond, Wash. Camera 102 provides image data in the form of streaming video at the rate of 30 frames per second in a standard 640×480 VGA. The focal length of the camera is 525 pixels with a field of view of approximately 63°. The camera also provides distance-to-target information from an on-board infrared transmitter/receiver pair. The focal length of the infrared transmitter/receiver is 580 pixels with a field of view of approximately 58°. The infrared data is provided as a 16 bit number at a refresh rate of 200 µs.

Computer 101 contains processor 104, memory 105, and software module 107. Software module 107 includes hardware drivers 108. In a preferred embodiment, hardware drivers include an image capturing program such as Kinect for Windows available from Microsoft in Software Development Kit 1.7. Software module 107 includes executable routine 109 for coordination and execution of the system functions as will be further described. The software module includes a database 110. In a preferred embodiment, the database is a SQL database which resides in memory. The software module also includes facial recognition routine 111.

Computer 101 is connected to display 106. Display 106 in the preferred embodiment is a flat panel LCD screen provided by LG Electronics of South Korea. Mirror 112 is positioned within view of camera 102 as will be further described.

Figure 2A:
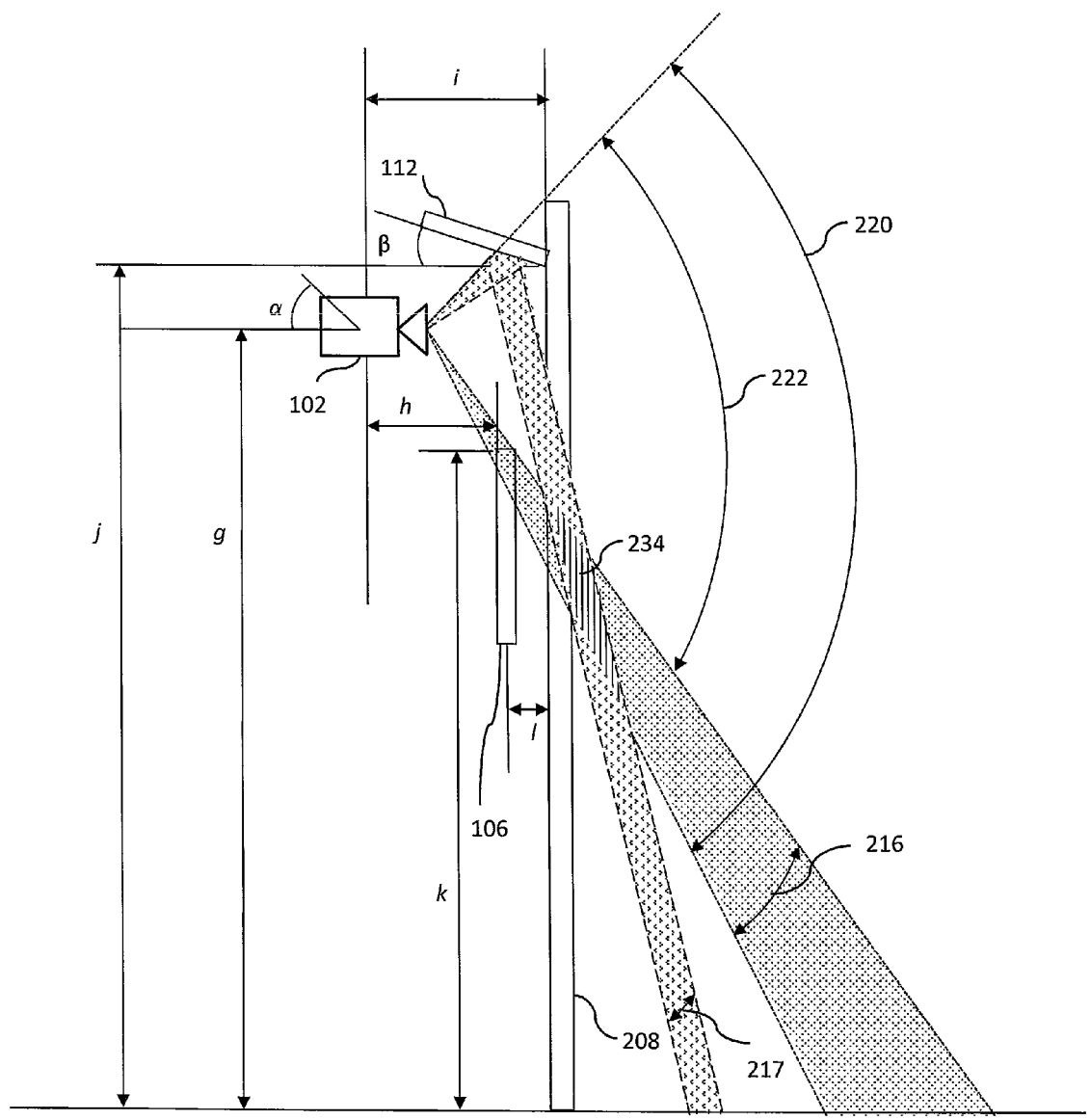
FIG. 2A is an elevation view of a preferred embodiment.

Referring to FIG. 2A, the relative positions of the views of camera 102 are shown. In general, camera 102 is positioned to achieve field of view 220. In the preferred embodiment, field of view 220 can range from 55°-110°. Glass 208 separates the user from camera 102 and display 106. Mirror 112 is positioned behind glass 208. In other preferred embodiments, when security is of lesser concern, mirror 112 can be positioned in front of glass 208. In a preferred embodiment, the mirror is a front silvered planar mirror having an optical coating to prevent distortion.

Display 106 is positioned a typical distance above the ground, usually about eye level. In order to be at eye level, the display necessarily blocks a portion of field of view 220, as shown by obstructed view 216. In an alternate preferred embodiment, field of view 220 may be narrow and/or the position of the camera relative to the display may be situated such that field of view 220 is not obstructed by the display. Partial field of view 222 represents the limited unobstructed view from camera 102. Reflected field of view 217 represents the portion of the total field returned by mirror 112. It is important to note that reflected field of view 217 allows the camera to compensate for the obstructed field of view 216 adjacent the display, thereby allowing actions that take place in the obstructed field of view to be recognized. Overlap area 234 represents the field of view visible to the camera that otherwise would be obstructed. It is also important to note that overlap area 234 is directly adjacent the display.

In a preferred embodiment, the camera is mounted a distance "g" from the floor and a distance "h" from the display. The visual axis of the camera is maintained at an angle α with respect to horizontal. The mirror is typically positioned a distance "i" from the camera and a distance "j" from the floor. The mirror is mounted at a fixed angle β from horizontal. The display is typically mounted at about eye level, at a distance "k" from the floor. The display is typically a distance "l" from the glass. The camera and mirror are shown positioned above the display; however, the camera and the mirror may also be positioned below or to the side of the display and still function as intended, so long as the relative positions of the devices provide for the overlap area. Table 1 summarizes the angles and distances as approximate ranges of the preferred embodiments:

TABLE 1

|   | Range | Preferred |
|---|---|---|
| g | 3.5-14 ft. | 7 ft. |
| h | 1 in.-8 ft. | 14 in. |
| i | 1 in.-2 ft. | 4 in. |
| j | 6-14 ft. | 7 ft. 1 in. |
| k | 3-9 ft. | 6 ft. |
| l | 1-6 in. | 2 in. |
| α | (−27)°-27° | −5° |
| β | 0°-110° | 45° |

Figure 2B:
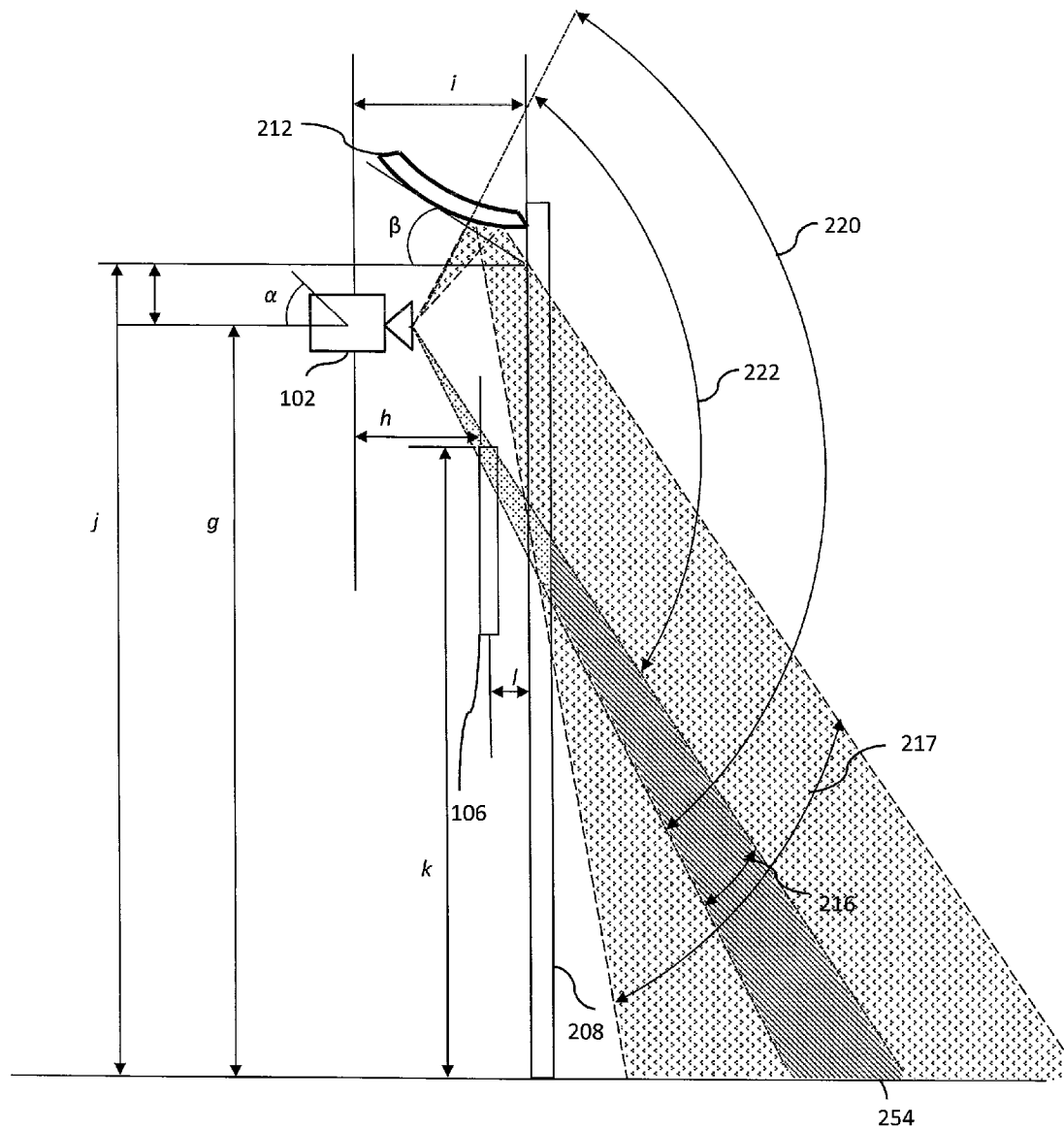
FIG. 2B is an elevation view of a preferred embodiment.
Figure 2C:
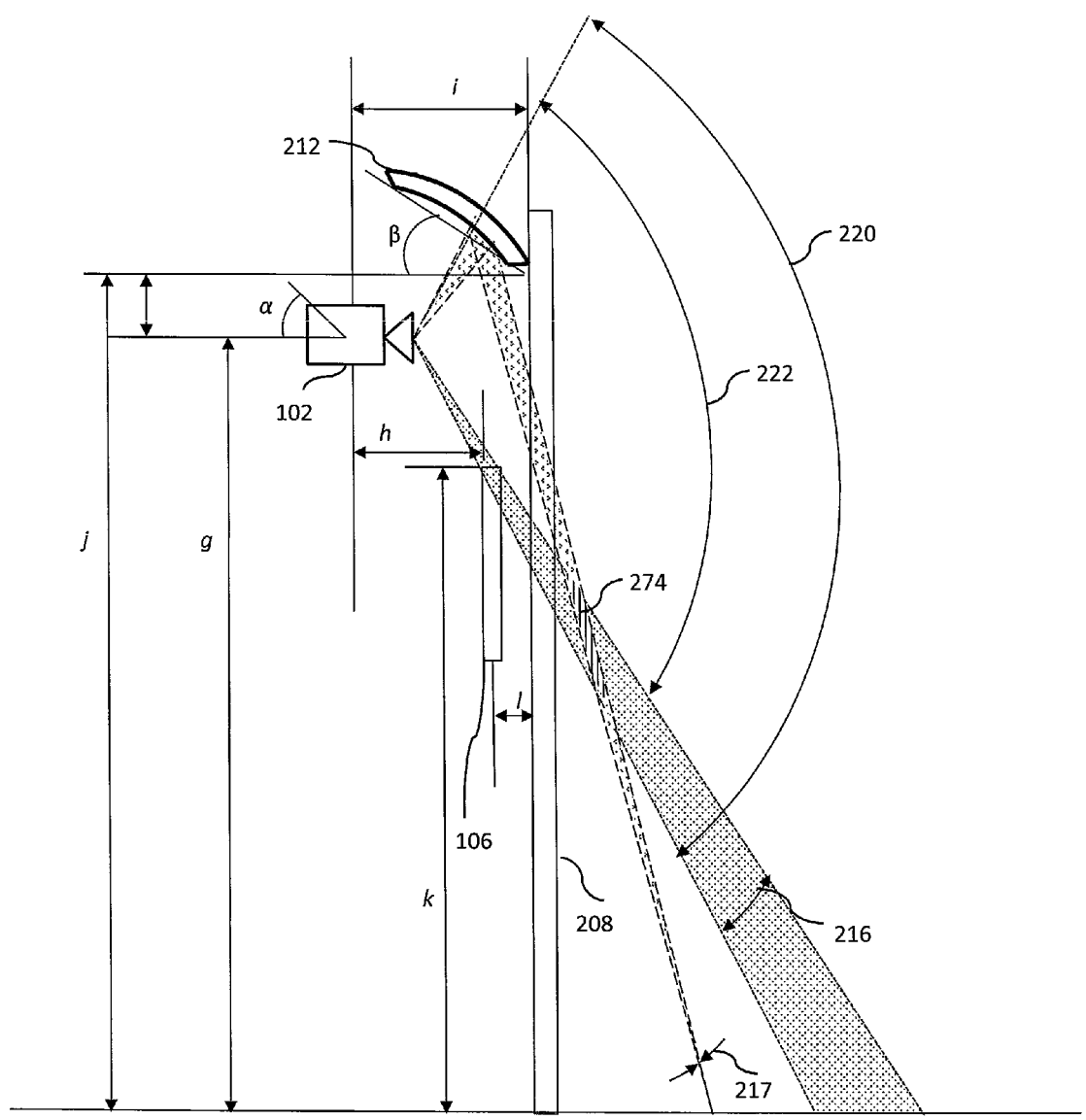
FIG. 2C is an elevation view of a preferred embodiment.

Referring to FIGS. 2B and 2C, other preferred embodiments are described. Curved mirror 212 is a curved mirror having a focal length f and a center curvature 2f. In a preferred embodiment, the curved mirror has a focal length of between about 1 and 4 inches. The curved mirror may be convex or concave. Further, the curved mirror may be curved in one or more planes, that is, it may spherical or cylindrical. The convex mirror in these embodiments is a front silvered mirror having an optical coating to reduce distortion. Curved mirror 212 provides the camera with a reflected field of view 217. Reflected field of view 217 results in overlap area 254. If the curved mirror is of a convex nature, overlap area 254 is significantly larger and overlap area 234. The larger overlap enables the system to track gross motor movements over a larger area. If the curved mirror is of a concave nature, overlap area 274 is significantly smaller, thus allowing the system to track fine motor movements more accurately than the prior art as will be further described.

Figure 3:
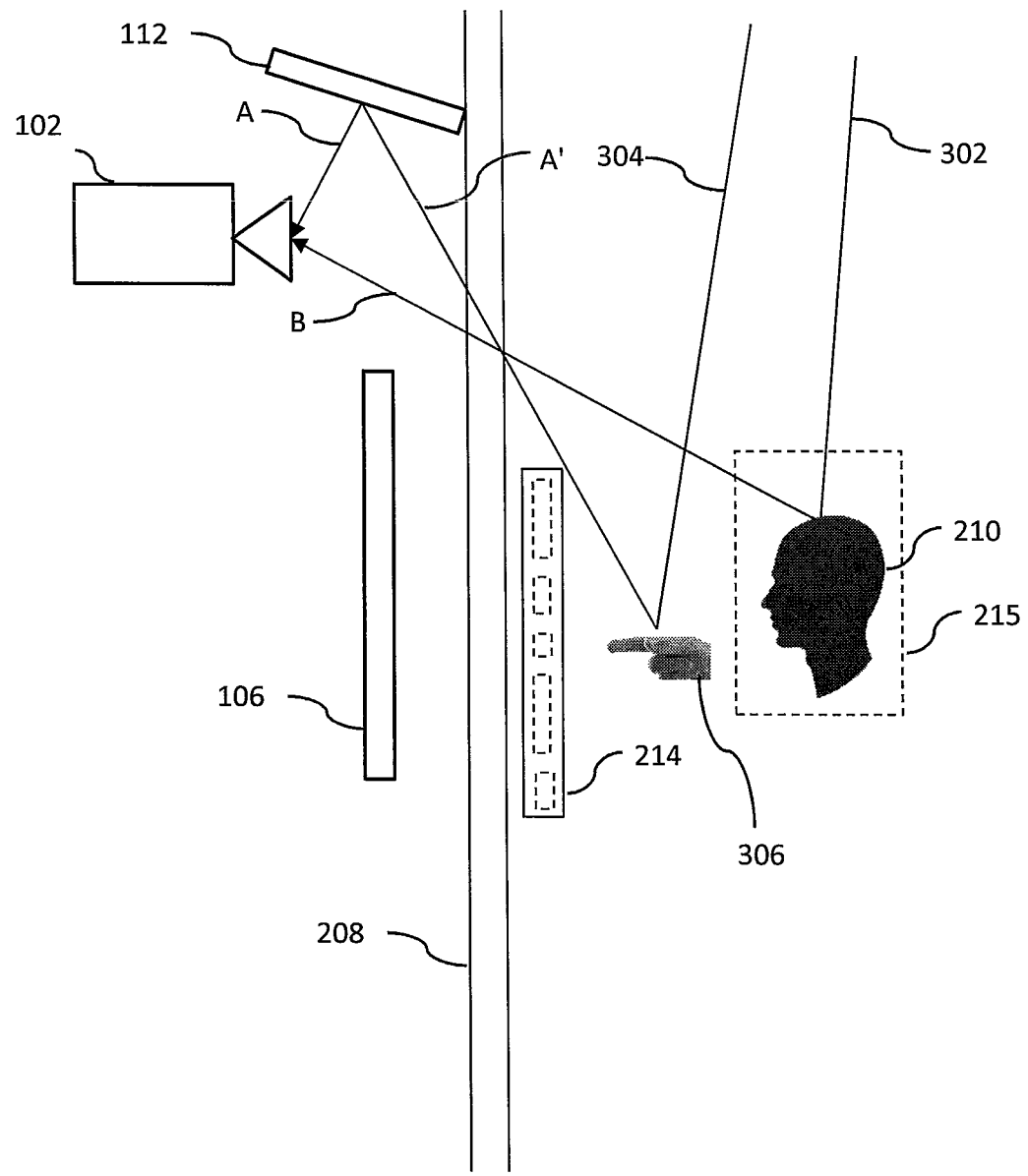
FIG. 3 is a ray diagram of a preferred embodiment.

Referring to FIG. 3, the relative positions of action area 214 and user 210 are described. Action area 214 is a 3-dimensional space defined by the software module. In general, the action area is positioned adjacent glass 208 and between user 210 and display 106. The action area is located in the overlap area, that is both in the reflected field of view and the obstructed field of view. A ray diagram shows incident light 302 reflected from user 210 into camera 102. Similarly, incident light 304 is reflected from hand 306 of user 210 to mirror 112 where it is further reflected to camera 102. Camera 102 reports distance "A+A" as the distance to hand 306 and distance "B" as the distance from the facial image of user 210 to the computer, as will be further described.

Figure 4:
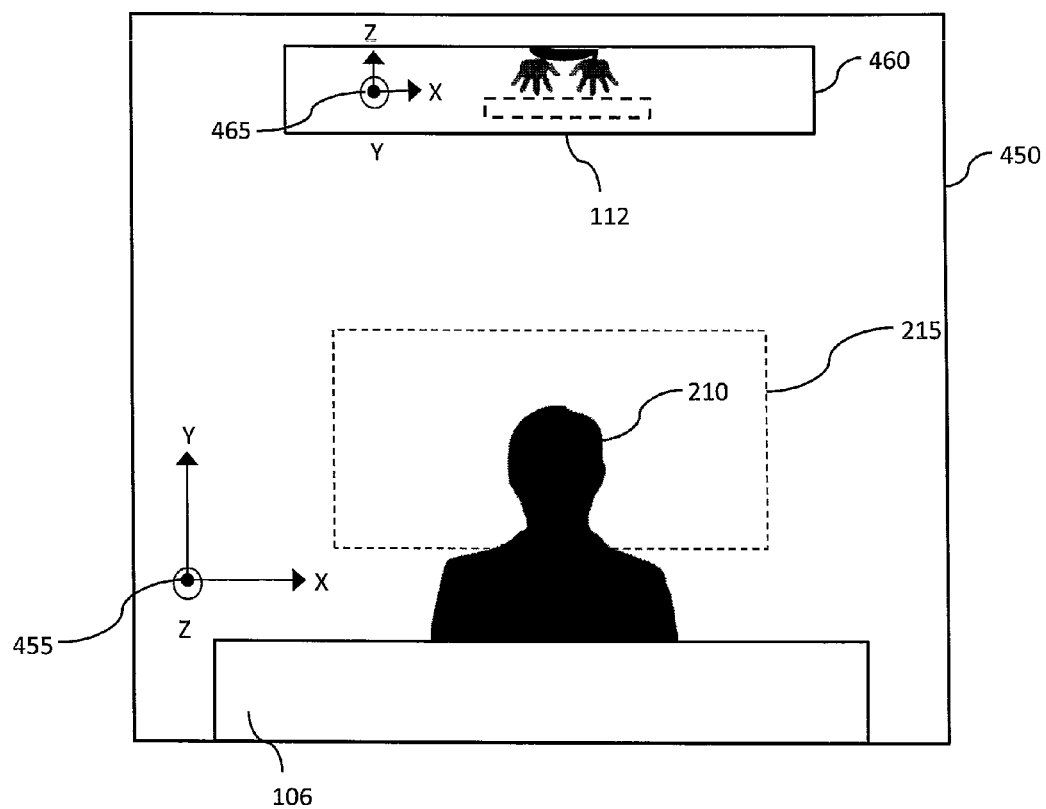
FIG. 4 is a schematic of a field of view of a camera of a preferred embodiment.

Referring to FIG. 4, the image data gathered by camera 102 includes image 450. Image 450 also includes reflected image 460. Reflected image 460 reflects light from mirror 112. In use, image 450 includes that portion of the user not blocked by display 106. In use, reflected image 460 includes both a view of the user's hands (which are obstructed from the view of the camera) and action area 214.

The reflected image alters the reference coordinates in the image data gathered by the camera. The camera receives data according to coordinate system reference 455 for the image 450. For example, the x axis represents horizontal. They axis represents vertical and the z axis is out of the page. However, reflected image 460 is reported to the camera according to coordinate system 465. In coordinate system 465, the x axis is horizontal, the y axis is out of the page and the z axis is vertical. Hence, they and z axes are reversed between coordinate systems 455 and 465. Action area 214, as will be further described later, is defined in reflected image 460. Facial recognition area 215, as will be described further later, is defined in image 450.

Figure 5:
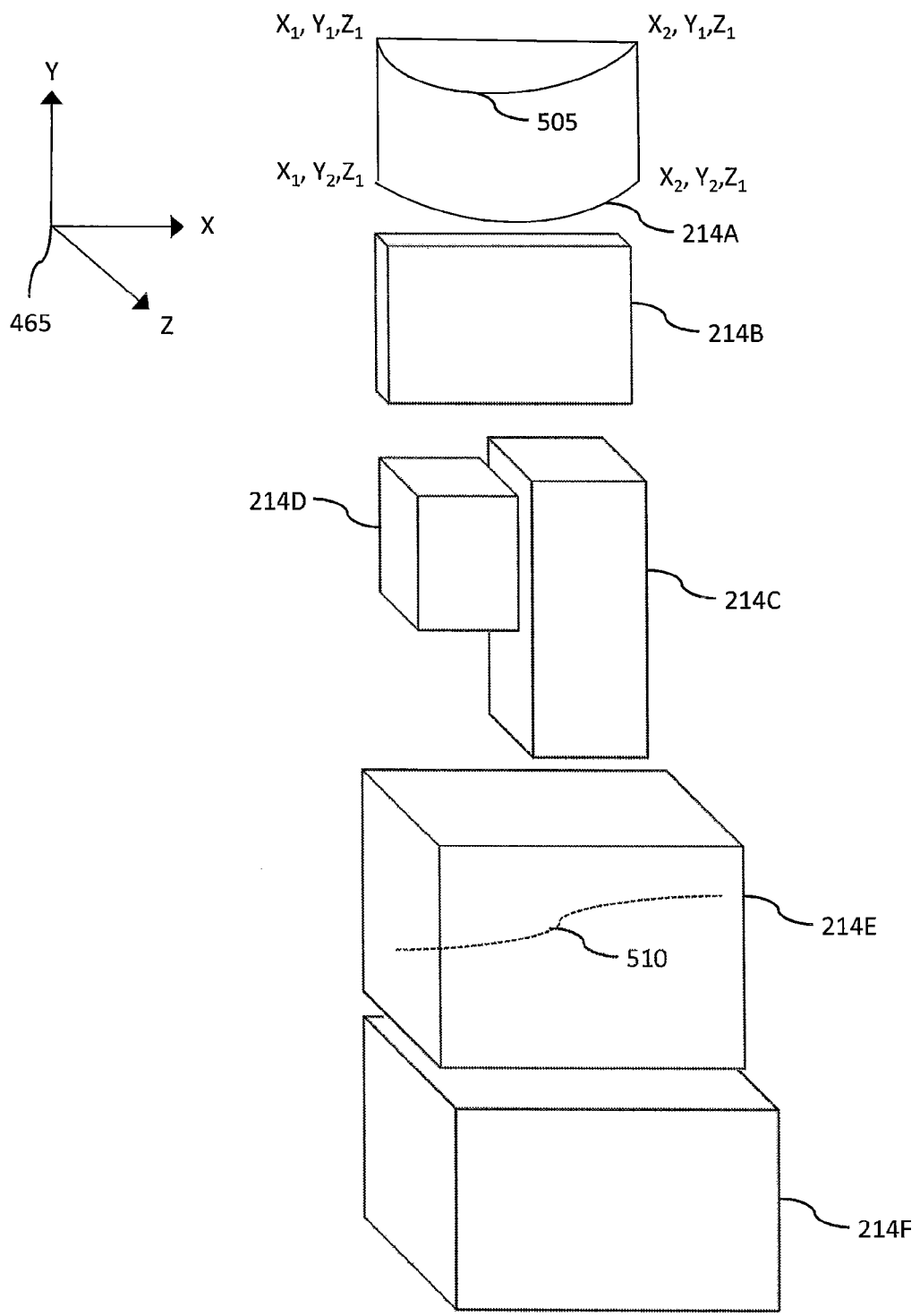
FIG. 5 is an isometric view of an action area of a preferred embodiment.

Referring to FIG. 5, action area 214 is described in more detail. Action area 214 is sub-divided into a series of three-dimensional geometric shapes within coordinate system 465. Each of the geometric shapes is bounded by a series of points which form lines enclosing certain discrete volumes. For example, sub-action area 214A is bounded by a set of points including $X_1, Y_1, Z_1; X_2, Y_1, Z_1; X_1, Y_2, Z_1; X_2, Y_2, Z_1$; and function 505. Function 505, in this example, is a hyperbolic function defined by the equation $$C \approx x^2 + y^2 \qquad (1)$$

Of course, other hyperbolic functions or linear functions may be used to define any set of points, in the X, Y, or Z directions, defining a general shape, so long as the function is closed with respect to the discrete area.

As further shown in FIG. 5, the various "widths," "lengths" and "depths" for each sub-action item can vary. For example, sub-action area 214B comprises a relatively "shallow" depth. Such shallow depths are useful to directly "mimic" a prior art touch screen, thereby conveying to the user a sensation that touching the glass surface causes the interaction. Sub-action areas 214C and 214D comprise "medium" depth areas. The medium depth areas convey to the user a sense that a computer function can be activated without actually touching the glass surface. Sub-action areas 214E and 215F comprise relatively "deep" action areas. Deep action areas, such as are shown in 214E and 214F are useful to record 3-dimensional paths indicated by a user, such as path 510.

Figure 6:
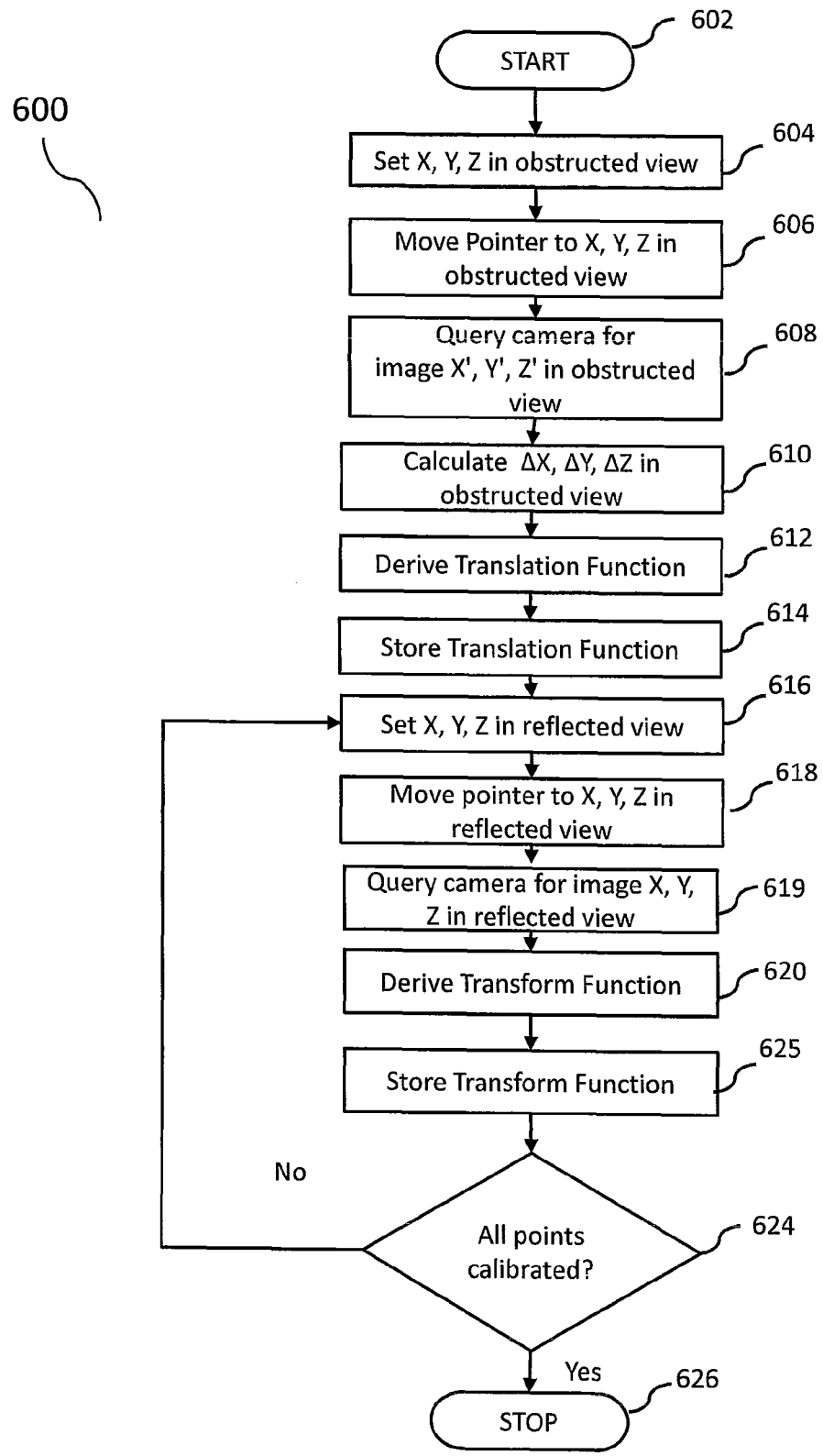
FIG. 6 is a flow chart of steps involved in the setup of a preferred embodiment.

Referring to FIG. 6, method 600 of calibrating the system is described. In order to correctly interpret images from the camera, it is necessary to calibrate actual locations within the action area to theoretical locations stored in memory. The following preferred method is used by the system to calibrate the boundaries of action area 214 and facial recognition area 215.

The method begins at step 602. At step 604, the processor is instructed to set an initial point X, Y, Z in the obstructed view to define a corner of the action area. At step 606, a pointer, such as a finger or stylus, is moved to the actual location X, Y, Z. At step 608, the processor queries the camera for the perceived image location X', Y', Z'. At step 610, the processor calculates the difference between the actual location X, Y, Z and the perceived location at X', Y', Z' to arrive at a difference ΔX, ΔY, ΔZ.

At step 612, ΔX, ΔY, and ΔZ are used to derive a translation function. In a preferred embodiment, the translation function is:

$$X = X' + \Delta X \quad (2)$$

$$Y = Y' + \Delta Y \quad (3)$$

$$Z = Z' + \Delta Z \quad (4)$$

At step 614, the translation function is stored. At step 616, the processor sets X, Y, Z in the reflected view. At step 618, the pointer is moved to the corresponding physical location in the reflected view. At step 619 the camera queried for the X, Y, Z location of the image. At step 620, a transform function is derived. Calibration of additional points is required if the transform function is nonlinear. Nonlinear transform functions may arise in embodiments where concave, convex or non-planar mirrors are used. If so, at step 624, the processor increments to the next point to be calibrated, and returns to step 616. If not, the processor moves to step 625 and stores the transform function. At step 626, the process is complete.

Figure 7:
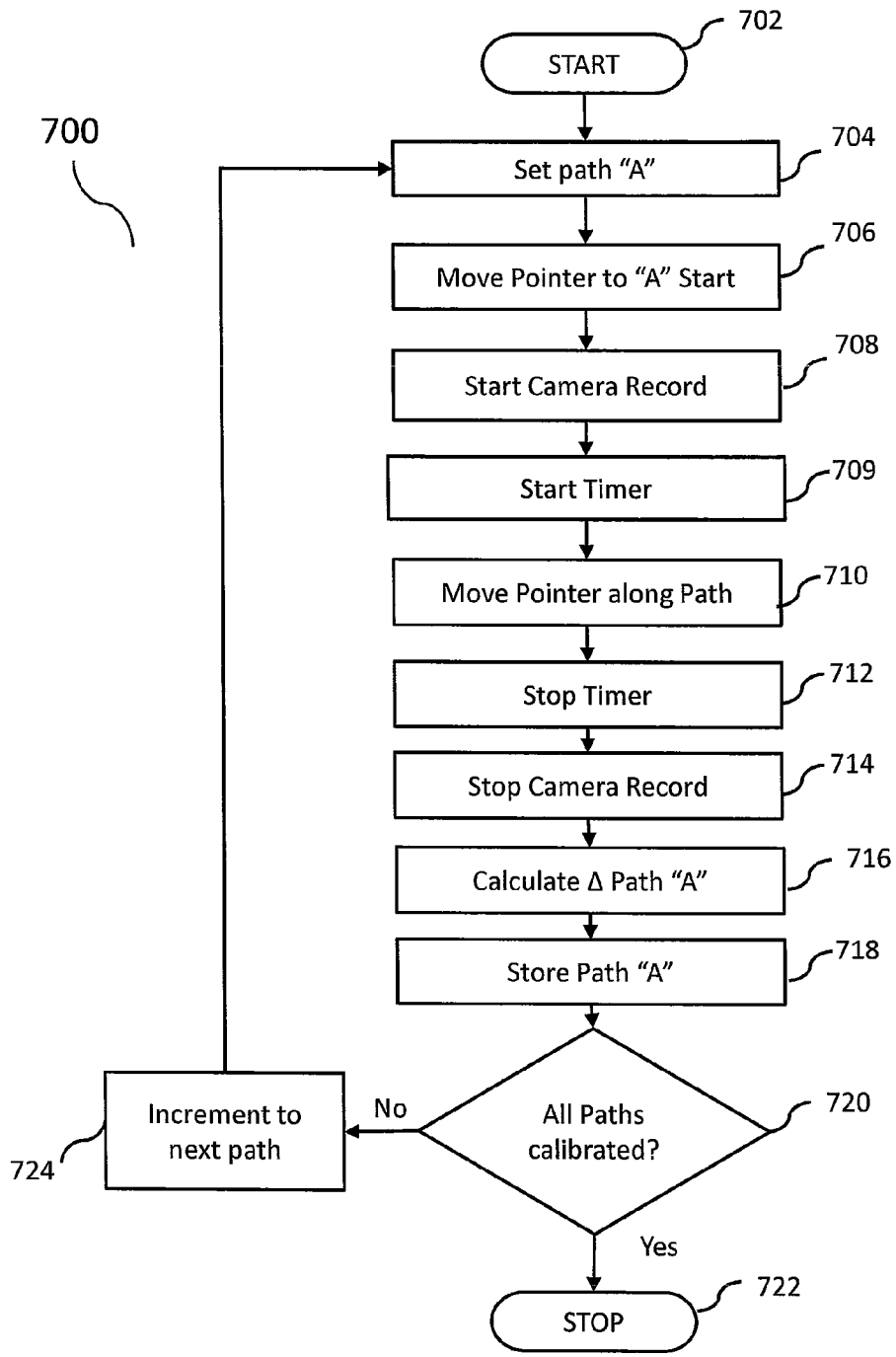
FIG. 7 is a flow chart of the steps involved in the use of a preferred embodiment.

Referring to FIG. 7, method 700 of calibrating a path is described. The method begins at step 702. At step 704, the chosen predefined path, such as path 510, is loaded into memory by the processor. At step 706, a pointer is moved to the start of the path. A step 708, the processor activates the camera and begins recording video data and storing it in memory. At step 709, the processor starts an internal timer to record the time it takes for the pointer to move along the path. At step 710, the pointer is moved through the path in action area 112 from the beginning of the path to the end of the path within a time "t". At step 712, upon the arrival of the pointer at the end of the path, the processor stops the timer.

At step 714, the processor then stops recording video images from the camera. At step 716, the processor calculates the equation of the path of "A" over the variables X, Y, Z and t, based on the recorded pointer movements. At step 716, the processor calculates the difference between the original path A and the stored path A'. At step 718, the new path A' is stored in memory. At step 720, the processor determines if all paths have been calibrated. If not, at step 724, the processor increments to the next path to be calibrated and returns to step 704. If all paths have been calibrated at step 720, the processor proceeds to step 722 and the process of path calibration is complete.

Figure 8:
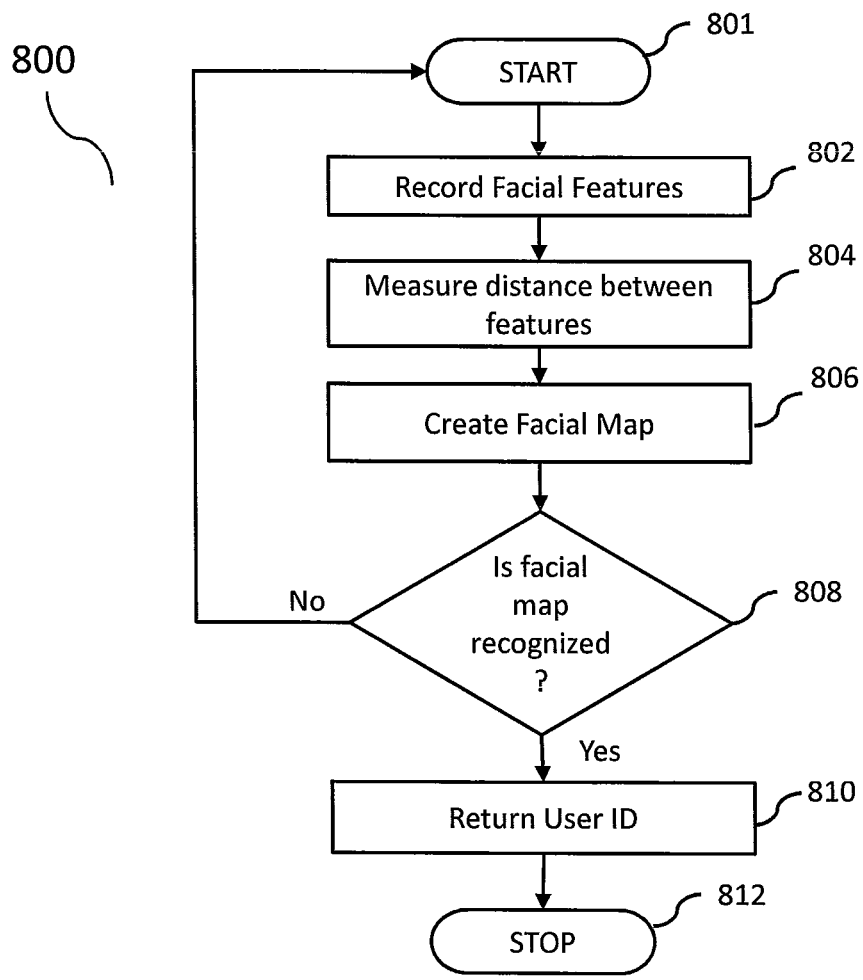
FIG. 8 is a flow chart of the steps involved in the facial recognition routine of a preferred embodiment.

Referring to FIG. 8, facial recognition routine 800 will be described. At step 801, the process starts. At step 802, the camera is queried for the locations of facial features including eye location and color, ear location, chin location and hair color. In a preferred embodiment, the query is accommodated by Microsoft SKD Rel. 7.1 .LIB file Microsoft.Kinect.Toolkit.FaceTracking. In a preferred embodiment, at least 121 different locations are determined. At step 804, the distances between facial features are measured. A "facial map" is created at step 806. The facial map includes a table of the facial features and the distances between them. At step 808, the facial map is compared to a set of digital images stored in database 110. If the map is not recognized, then the process returns to step 801. If the facial map is recognized, then the process moves to step 810. At step 810, the user identification demographic is returned. At step 812, the process concludes.

Figure 9:
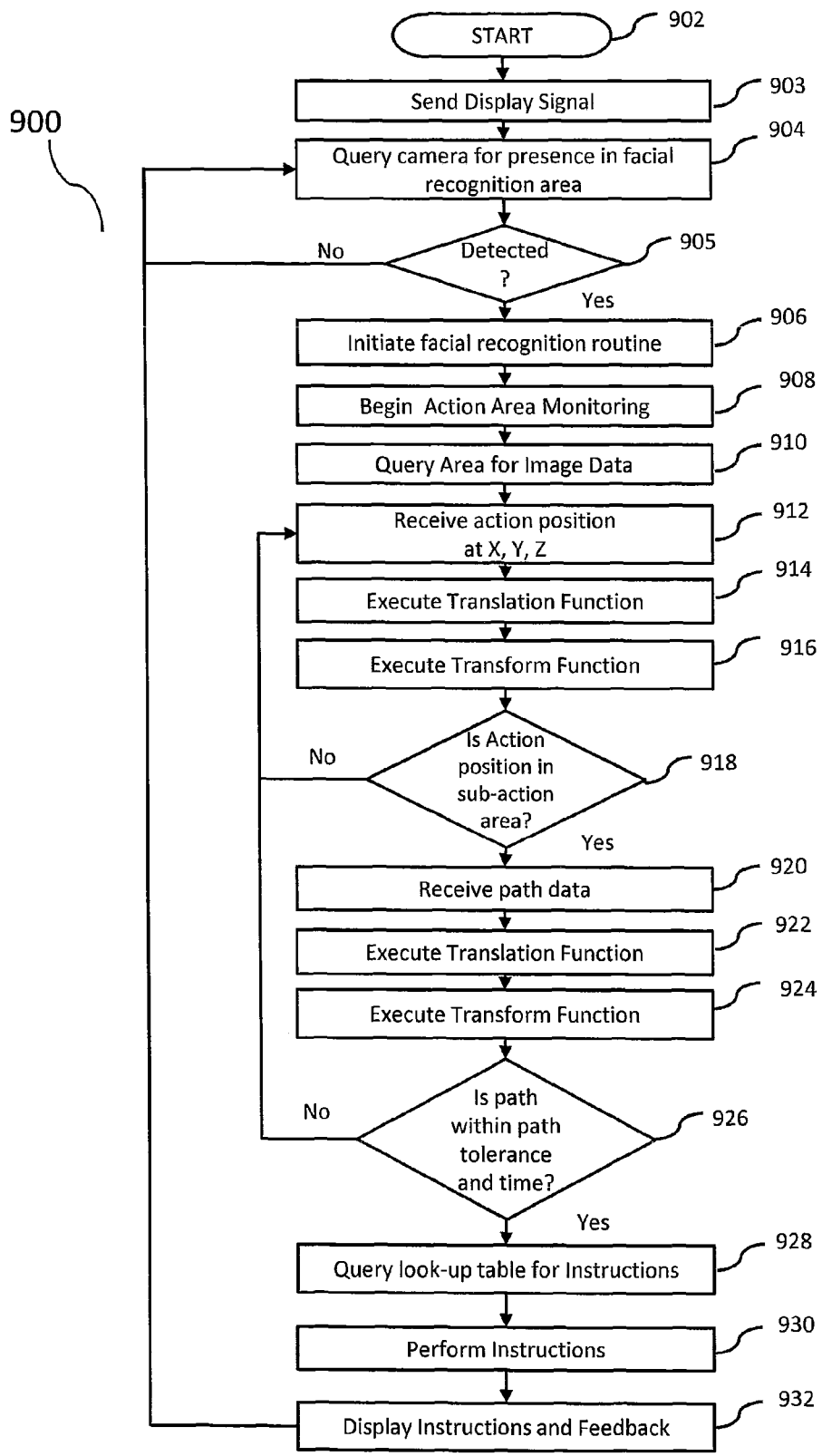
FIG. 9 is a flow chart of the steps involved for interaction with a virtual touch screen in a preferred embodiment.

Referring to FIG. 9, the steps involved in method 900 of use of motion detection system are described. At step 902, the processor is activated and loads the executable routine. A display signal is sent to the display at step 903 by the executable routine. In a preferred embodiment, the display signal includes a graphical and text picture which corresponds to a two-dimensional representation of the access area and sub-areas. At step 904, the camera is queried for motion presence in facial recognition area. At step 905, if no presence is detected, the processor returns to step 904. If a presence is detected, the process moves to step 906 and initiates the facial recognition routine to determine the identity of the user. In a preferred embodiment, the facial recognition routine sorts through the database to identify facial features which match a predetermined pattern. The database then is queried for associated user information, such as the user's name, and account status, which is stored in the memory for later use by the processor.

The processor then moves to step 908 where it begins monitoring the action area. At step 910, the camera is queried for image data within the action area.

At step 912, image data and distance data are perceived in the action area and returned from the camera as coordinates X, Y, Z. At step 914, the processor executes the translation function to translate the perceived coordinates into the actual coordinates. At step 916, the processor executes the translation function to interpret the coordinates of the reflected view into the coordinates of the unobstructed view so that "Y" and "Z" dimension information is accurately reported to the processor. At step 918, if the action position is no in a sub-action area then the process returns to step 912. If it is in a sub-action area, then the processor proceeds to step 920. At step 920, the processor receives path data from the action area including a set of path variables X, Y, Z over a defined time period, Δt. At step 922, the processor executes the translation function to translate the perceived path to the actual path. At step 924, the processor, executes the transform function to change the coordinates of the reflected view into the coordinates of the unobstructed view so that the path information is accurately reported to the processor. At step 926, the processor determines if a path defined by the action position corresponds to a path within a predefined tolerance and predefined time period. If the path is not within a predefined tolerance and a predefined time period, the processor returns to step 912. If the path is within a predetermined tolerance and a predefined time period, the processor proceeds to step 928. At step 928, a look-up table is queried for a predetermined instruction, if an action is within an action area and/or a motion is within a predefined path tolerance and time period. At step 930, the processor performs the instruction according to the look-up table. At step 932, the processor displays the results of and feedback from the instruction. After the instruction is displayed, the processor returns to step 904 and again queries the camera for the presence of a subject in the facial recognition area.

Figure 10:
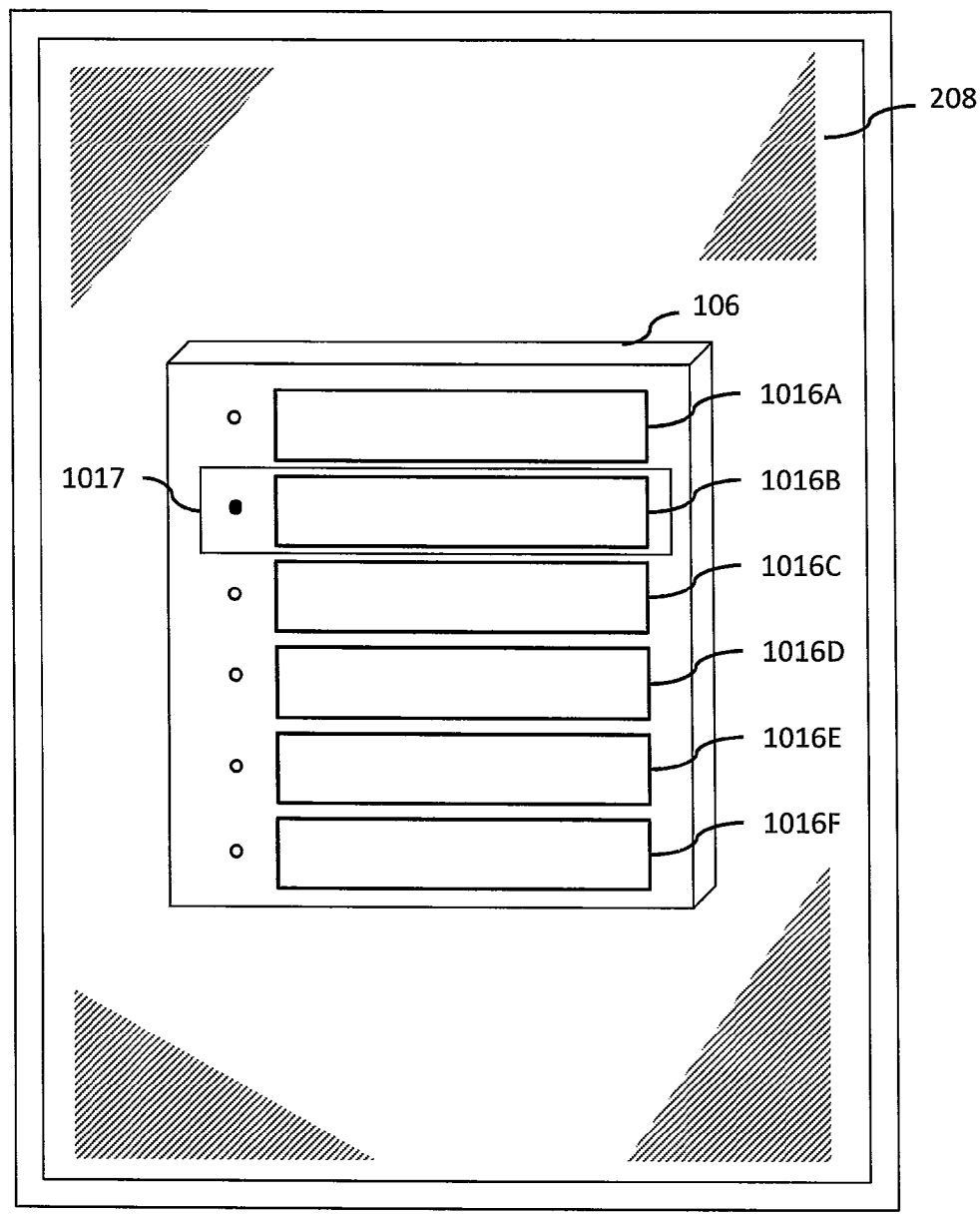
FIG. 10 is an elevation view of a display screen of a preferred embodiment.

FIG. 10 shows display 106 as viewed by a user outside glass 208. Selections 1016A-F are shown on display 106. A user can see the selections available on the display but cannot physically touch the display because it is behind glass 208. Feedback display 1017 provides visual confirmation of the system interface to the user. Confirming, that is, that actions have been recognized and correctly interpreted by the system. For example, an interaction with sub-action area 214B results in selection 1016B shown to the user to be selected as a radio button.

It will be appreciated by those skilled in the art that changes could be made to the embodiments described above without departing from the broad inventive concept. It is understood, therefore, that this disclosure is not limited to the particular embodiments herein, but it is intended to cover modifications within the spirit and scope of the present disclosure as defined by the appended claims.

The invention claimed is:
1. A computer system for interpreting distance and position as a set of computer commands comprising:
  a display;
  a camera, positioned adjacent the display, so as to provide a reflected field of view and a blocked field of view;
  a mirror, positioned adjacent the camera, so as to encompass the reflected field of view;
  a distance sensor, positioned adjacent the display, so as to provide distance to target information;
  a computer, connected to the camera and the distance sensor, programmed to carry out a computer implemented method having the steps of:
    defining an action area within the blocked field of view and the reflected field of view;
    retrieving a set of reflected distance to target information from the distance sensor, in the action area, in a first coordinate system;
    retrieving a set of position information, from the camera, in the first coordinate system;
    retrieving a set of image information, from the camera, in a second coordinate system;
    translating the set of reflected distance to target information and the set of position information, from the first coordinate system into the second coordinate system;
    interpreting the set of reflected distance to target information and the first set of position information as a computer command of the set of computer commands, based on the set of image information;
  wherein the camera gathers image data comprising an image based on the reflected field of view and the blocked field of view;
  wherein a first portion of the image based on the blocked field of view is based on a first coordinate system reference;
  wherein a second portion of the image based on the reflected field of view:
    comprises a reflected image based on light reflected from the mirror, and
    is based on a second coordinate system reference comprising an axis that is different from an axis of the first coordinate system; and,
  wherein the second coordinate system reference comprises two axes that are reversed from two axes of the first coordinate system reference.
2. The computer system of claim 1 wherein the step of defining further comprises:
  defining the action area adjacent the display.
3. The computer system of claim 1 wherein the action area is comprised of a set of sub-action areas.
4. The computer system of claim 3 wherein a sub-action area, of the set of sub-action areas, is defined by a unique closed space.
5. The computer system of claim 3 wherein a sub-action area, of the set of sub-action areas, is defined in part by a linear function.
6. The computer system of claim 1 further comprising a transparent barrier; and,
  wherein the display, the camera, the mirror, and the distance sensor are positioned adjacent a first side of the transparent barrier; and,
  the action area is positioned adjacent a second side of the transparent barrier.
7. The computer system of claim 1 further comprising a transparent barrier; and,
  wherein the display, the camera, and the distance sensor are positioned adjacent a first side of the transparent barrier; and,
  the action area and the mirror are positioned adjacent the second side of the transparent barrier.
8. The computer system of claim 1 wherein the mirror is one from the group consisting of a concave mirror and a convex mirror.
9. The computer system of claim 1 wherein the implemented method comprises the further step of displaying a feedback response, related to the computer command, on the display.
10. The computer system of claim 1 wherein the computer implemented method comprises the step of:
  transforming the set of reflected distance to target information based on a mirror curvature.
11. The computer system of claim 1 wherein the step of translating further comprises the steps of:
  setting an initial location in the second coordinate system;
  moving a pointer to the initial location;
  querying the camera for a perceived location;
  calculating the difference between the initial location and the perceived location; and,
  deriving a translation function based on the initial location and the perceived location.
12. The computer system of claim 1 wherein the computer implemented method further comprises the steps of:
  setting a reflected location in the first coordinate system;
  moving a pointer to the reflected location;
  querying the camera for a perceived reflected location; and,
  deriving and storing a transform function based on the reflected location and the perceived reflected location.
13. The computer system of claim 1 wherein the camera is positioned adjacent the display so as to further provide an unblocked view; and
  wherein the computer is programmed to carry out the additional steps of:
    recording in a set of image information from the camera from the unblocked view; and,
    interpreting the set of image information as a computer command.
14. The computer system of claim 1 wherein the computer is programmed to carry out the additional step of:
  interpreting the set of image information as a face.
15. The computer system of claim 14 wherein the step of interpreting the set of image information further comprises the steps of:
  identifying a set of facial features;
  determining a map of the set of facial features; and,
  retrieving a set of demographic information related to the map.
16. A method for interpreting distance and position as a set of computer commands comprising the steps of:
  providing a display;

providing a camera, positioned adjacent the display, so as to provide a reflected field of view and a blocked field of view;

providing a mirror, positioned adjacent the camera, so as to encompass the reflected field of view;

providing a distance sensor, positioned adjacent the display;

providing a computer, connected to the camera and the distance sensor;

defining an action area within the blocked field of view and the reflected field of view;

retrieving a set of reflected distance to target information from the distance sensor in the action area in a first coordinate system;

retrieving a first set of position information, from the camera, in the first coordinate system;

retrieving a second set of position information, from the camera, in a second coordinate system;

translating the set of reflected distance to target information and the first set of position information from the first coordinate into the second coordinate system;

interpreting the set of reflected distance to target information and the first set of position information as a computer command of the set of computer commands, based on the second set of position information;

wherein the camera gathers image data comprising an image based on the reflected field of view and the blocked field of view;

wherein a first portion of the image based on the blocked field of view is based on a first coordinate system reference;

wherein a second portion of the image based on the reflected field of view:
  comprises a reflected image based on light reflected from the mirror, and
  is based on a second coordinate system reference comprising an axis that is different from an axis of the first coordinate system; and, wherein the second coordinate system reference comprises two axes that are reversed from two axes of the first coordinate system reference.

17. The method of claim 16 further comprising:
locating the action area adjacent the display.

18. The method of claim 16 further comprising:
creating a set of sub-action areas.

19. The method of claim 16 further comprising providing a transparent barrier:
  wherein the display, the camera, the mirror, and the distance sensor are positioned adjacent a first side of the transparent barrier; and,
  the action area and the mirror are positioned adjacent a second side of the transparent barrier.

20. The method of claim 16 further comprising providing a transparent barrier:
  wherein the display, the camera, and the distance sensor are positioned adjacent a first side of the transparent barrier; and,
  creating the action area and the mirror are positioned adjacent the second side of the transparent barrier.

21. The method of claim 17 further comprising:
providing the mirror is one from the group consisting of a concave mirror and a convex mirror.

22. The method of claim 21 further comprising the step of:
applying a transform to the set of reflected distance to target information based on a mirror curvature.

23. The method of claim 17 further comprising:
displaying a feedback response, on the display, associated with the computer command.

24. The method of claim 17 wherein the step of translating further comprises the steps of:
setting an initial location in the second coordinate system;
moving a pointer to the initial location;
querying the camera for a perceived location;
calculating the difference between the initial location and the perceived location; and,
deriving a translation function based on the initial location and the perceived location.

25. The method of claim 17 wherein the step of translating further comprises the steps of:
setting a reflected location in the first coordinate system;
moving a pointer to the reflected location;
querying the camera for a perceived reflected location; and,
deriving and storing a transform function based on the reflected location and the perceived reflected location.

26. The computer system of claim 1:
wherein a first portion of the image based on the blocked field of view includes facial characteristics of the user; and,
wherein a second portion of the image based on the reflected field of view includes a hand of a user.

* * * * *